(12) United States Patent
Hisamoto (10) Patent No.: US 7,278,150 B2
(45) Date of Patent: Oct. 2, 2007

(54) DISC-CHUCKING MECHANISM HAVING CONTRACTABLE/EXPANDABLE O-RING FOR FIXING DISC

(75) Inventor: Kenji Hisamoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 11/035,368

(22) Filed: Jan. 13, 2005

(65) Prior Publication Data

US 2005/0161887 A1    Jul. 28, 2005

(30) Foreign Application Priority Data

Jan. 28, 2004  (JP)  ............................. 2004-020231
May 12, 2004  (JP)  ............................. 2004-141858

(51) Int. Cl.
*G11B 17/03*   (2006.01)

(52) U.S. Cl. ..................................... 720/706

(58) Field of Classification Search ................ 720/706, 720/707, 709, 695
See application file for complete search history.

(56) References Cited

U.S. PATENT DOCUMENTS 4,881,745 A * 11/1989 Peters ........................ 279/2.09
5,014,143 A * 5/1991 Mori et al. ............... 360/99.12
5,208,798 A * 5/1993 Funabashi et al. .......... 720/706

FOREIGN PATENT DOCUMENTS

JP   09-007262   1/1997

* cited by examiner

*Primary Examiner*—David Davis
(74) *Attorney, Agent, or Firm*—Canon U.S.A. Inc. I.P. Div (57) ABSTRACT

A chucking mechanism which reliably attaches and detaches a disc with high precision. The chucking mechanism includes a shaft for supporting the disc and having a tapered recess, a tapered cone adapted to fit in the tapered recess, and a piston for moving a rod, attached to the tapered cone, through a hole formed in the shaft. The mechanism also includes an O-ring having a variable diameter and being disposed between the tapered cone and the tapered recess. As the piston moves the tapered cone in a first direction, the tapered cone gradually expands the diameter of the O-ring to press and fix the disc. As the piston moves the tapered cone in a second direction, the diameter of the O-ring gradually contracts to move out of contact with the disc so as to release the disc.

9 Claims, 7 Drawing Sheets

DISC-CHUCKING MECHANISM HAVING CONTRACTABLE/EXPANDABLE O-RING FOR FIXING DISC

BACKGROUND OF THE INVENTION

1. Field of the Invention

The present invention relates to a disc-chucking mechanism which attaches and detaches a disc in a hard disk device, a servo writer, a media tester, a head tester, etc.

2. Description of the Related Art

A typical disc for use in a hard disk device is driven with a spindle motor. The disc is produced by polishing a blank material of aluminum or glass to obtain a precisely flat surface and applying a metal material on the flat surface. The disc has an extremely small thickness relative to the flatness thereof and is very easily distorted.

Therefore, it is difficult to attach the disc to the spindle motor without degrading the flatness of the disc. In addition, when the disc is used in the servo writer, the media tester, or the like and must be attached and detached frequently, it is necessary to hold the disc in a short time with high reliability.

Figure 8:
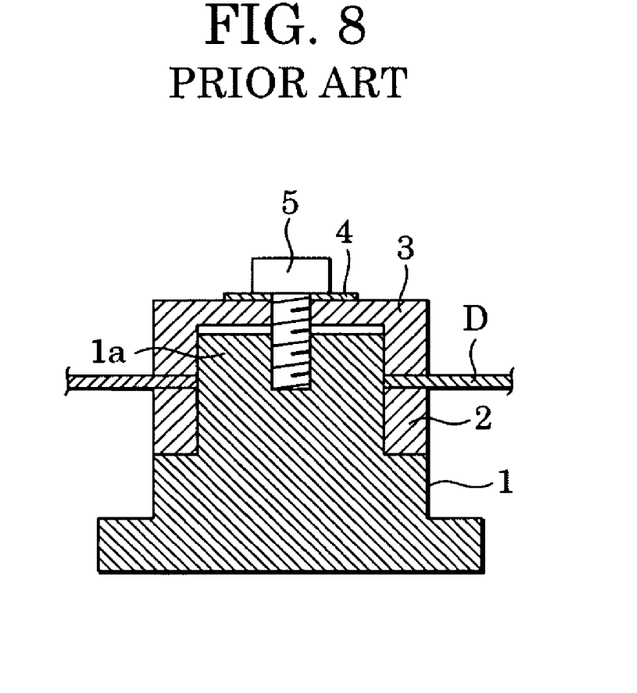
FIG. 8 is a sectional view showing a known chucking mechanism.

FIG. 8 is a diagram showing the construction of a known chucking mechanism. When a disc D is fitted to a central portion 1a of a cylindrical center shaft 1, a high-precision parallel spacer 2 is disposed around the central portion 1a and the disc D is placed on the parallel spacer 2. Then, a cap 3 is placed on the top surface of the disc D and is fastened to the central portion 1a with a washer 4 and a screw 5. When the screw 5 is attached, a torque driver or the like must be used to prevent the disc D from distorting. Thus, there is a disadvantage in that the attaching/detaching process requires a long time.

Figure 9:
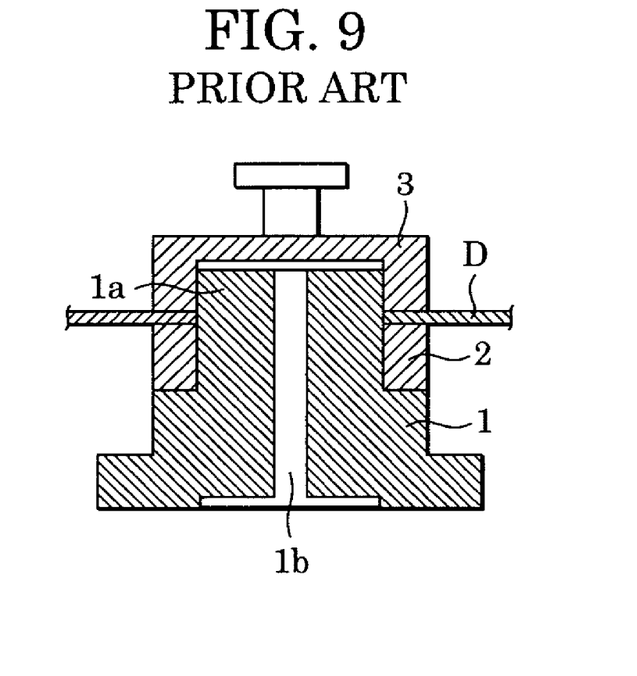
FIG. 9 is a sectional view showing another known chucking mechanism.

In addition, as shown in FIG. 9, instead of using the screw 5, a disc D may also be attached by vacuum suction using a suction hole 1b formed in a center shaft 1. However, since a cap 3 is provided as a separate component, a conveying mechanism for the cap 3 is required when automation for mass production is to be achieved. Accordingly, this structure is not suitable in view of space saving and cost reduction.

Figure 10:
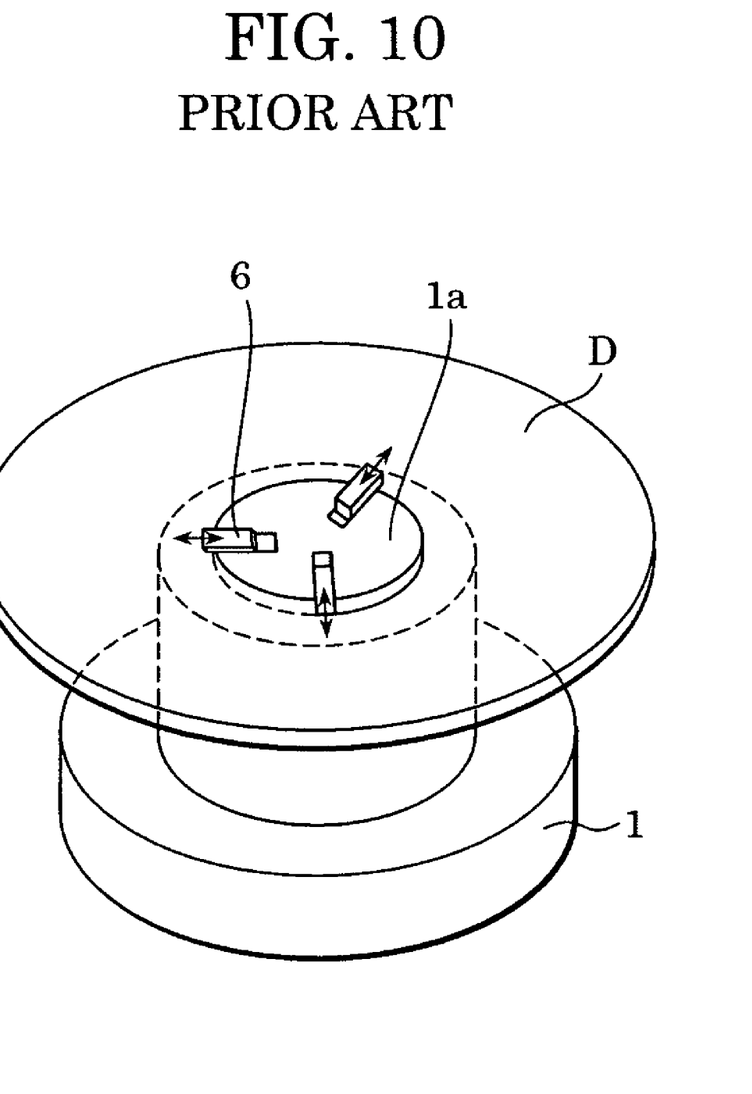
FIG. 10 is a perspective view showing another known chucking mechanism.

In addition, as shown in FIG. 10, a disc D may also be attached/detached by moving three lugs 6 provided on a central portion 1a with respect to an inner circumferential portion of the disc D in the radial direction thereof. In this method, a separate component like the above-mentioned cap 3 or the like is not required. However, since the disc D is held using small regions where the three lugs 6 come into contact with the disc D, stress concentration occurs at these regions and the disc D is easily distorted. Therefore, it is difficult to maintain the high flatness of the disc D.

In the above-described known structures, a mechanism which quickly and reliably attaches/detaches the disc with high precision and small distortion is not established, although such a mechanism is important.

SUMMARY OF THE INVENTION

The present invention is directed to a disc-chucking mechanism which overcomes the above-structured disadvantages and which is capable of quickly and reliably attaching/detaching a disc with high precision.

In one aspect of the present invention, a disc-chucking mechanism for fixing a ring-shaped disc includes: to a center shaft having a tapered recess, a hollow section, and a hole extending from the tapered recess to the hollow section, wherein the center shaft is adapted to support the disc; a piston provided in the hollow section; a rod attached to the piston, wherein the piston is operable to move the rod through the hole; a tapered cone having a tapered portion sized and shaped to fit in the tapered recess of the center shaft, wherein the rod extends through the hole and is attached to the tapered cone so that the piston can move the tapered cone; and an elastic O-ring having a variable diameter, wherein the O-ring is disposed between the tapered portion and the tapered recess, wherein, as the piston moves the tapered portion in a first direction, the tapered portion expands the diameter of the O-ring so that the O-ring presses the disc and fixes the disc, and wherein, as the piston moves the tapered portion in a second direction, the tapered portion moves relative to the O-ring such that the diameter of the O-ring contracts to move out of contact with the disc and releases the disc.

In the disc-chucking mechanism according to the present invention, when the disc is being attached, it is moved in a region outside the outer circumference of the O-ring. Then, when the disc is fixed, the diameter of the O-ring is increased by the tapered cone and the O-ring presses the inner peripheral edge of the disc to fix the disc. Accordingly, the disc is reliably and easily attached/detached by the mechanism having an integral structure without using a separate cap or a screw.

Further features and advantages of the present invention will become apparent from the following description of the exemplary embodiments with reference to the attached drawings.

DESCRIPTION OF THE EMBODIMENTS

The present invention will be explained in detail below with reference to embodiments shown in FIGS. 1 to 7.

First Embodiment

Figure 1:
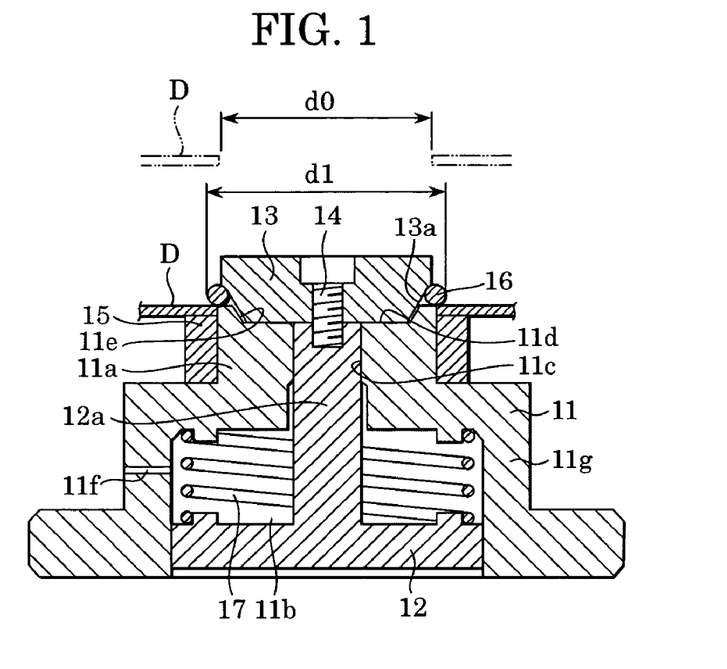
FIG. 1 is a sectional view showing a chucking mechanism according to a first embodiment of the present invention in the state in which a disc is fixed.

FIG. 1 is a sectional view showing a disc-chucking mechanism according to a first embodiment. With reference to the figure, a center shaft 11 is shaped like a base in cross section and includes an intermediate portion 11g, a cylindrical central portion 11a above the intermediate portion, a circular hollow section 11b below the intermediate portion, and a hole 11c formed at the center of the central portion 11a. An outer diameter of the central portion 11a is substantially the same as an inner diameter d0 of a disc D to be attached, and a recess is formed at the top of the central portion 11a. The recess has a flat bottom surface 11d and a tapered portion 11e defined by an inner peripheral surface which inclines inward.

A piston 12 is fitted in the hollow section 11b such that the piston 12 can move vertically (as shown in the figure), and a rod 12a provided at an upper region of the piston 12 is inserted through the hole 11c in the center shaft 11. In addition, a tapered cone 13 having an outer diameter that is smaller than the inner diameter d0 of the disc D is attached to the rod 12a with a screw 14 at the top end of the rod 12a. The tapered cone 13 has a tapered portion 13a which matches the tapered portion 11e of the central portion 11a at the bottom periphery of the tapered cone 13.

A cylindrical parallel spacer 15 processed with high precision for supporting the disc D is disposed around the central portion 11a. The parallel spacer 15 has a height calculated by subtracting the thickness of the disc D from the height of the central portion 11a. In addition, an expandable/contractible O-ring 16 made of, for example, synthetic rubber, is disposed between the top surface of the central portion 11a and the tapered portion 13a of the tapered cone 13.

In addition, a coil spring 17 which exerts a biasing force for pushing the piston 12 downward is disposed in the hollow section 11b. The center shaft 11 is provided with an air vent 11f which opens into the hollow section 11b.

Figure 2:
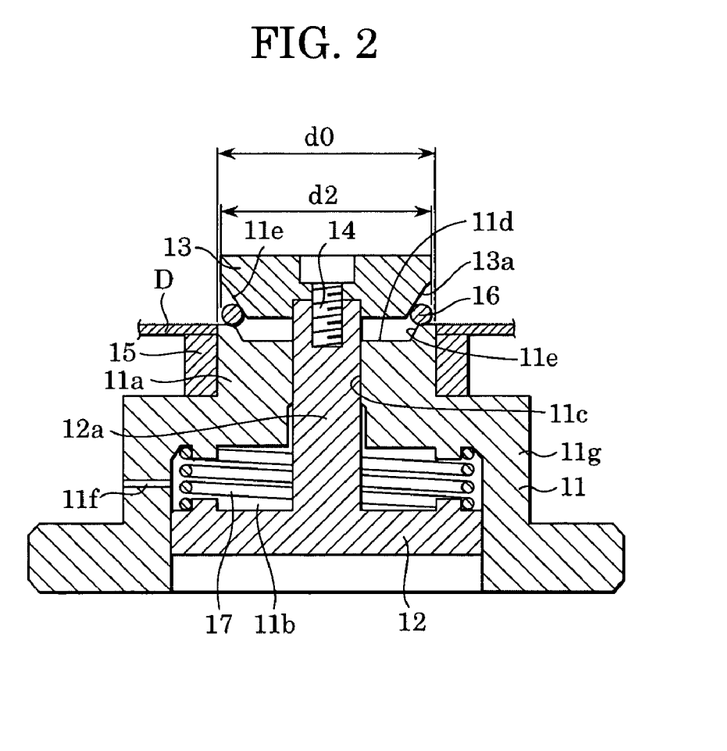
FIG. 2 is a sectional view showing the chucking mechanism in the state in which the disc is released.

In the above-described structure, when the piston 12 is moved upward by high-pressure air or downward by the biasing force of the coil spring 17, the tapered cone 13 connected to the rod 12a moves upward or downward together with the piston 12. Accordingly, as shown in FIGS. 1 and 2, the O-ring 16 moves along the tapered portion 13a of the tapered cone 13 and the tapered portion 11e of the central portion 11a, thereby changing its diameter. More specifically, the outer diameter of the O-ring 16 is changed to d1 when the tapered cone 13 is moved downward, as shown in FIG. 1, and is changed to d2 when the tapered cone 13 is moved upward, as shown in FIG. 2.

When high-pressure air is supplied to the piston 12 and the piston 12 is pushed upward, the tapered cone 13 moves upward and the O-ring 16 contracts due to its elasticity, as shown in FIG. 2. Accordingly, the outer diameter of the O-ring 16 is reduced to below the inner diameter d0 of the disc D (d2<d0). In this state, the inner peripheral edge of the disc D can move without being impeded by the tapered cone 13 or the O-ring 16, and therefore the disc D can be placed on or removed from the parallel spacer 15 around the central portion 11a.

When the supply of high-pressure air to the piston 12 is stopped in the state in which the disc D is attached, the piston 12 and the tapered cone 13 move downward due to the biasing force applied by the coil spring 17. Therefore, the O-ring 16 expands as shown in FIG. 1 (d1>d0) and comes into press contact with the inner peripheral edge of the disc D. Since the diameter of the O-ring 16 gradually increases along the tapered portion 13a, the inner peripheral edge of the disc D is prevented from being distorted by suddenly being pressed when it is fixed.

When the tapered cone 13 moves downward, the bottom central portion thereof comes into contact with the bottom surface 11d of the recess in the central portion 11a, and this functions as a mechanical stopper which determines the position to which the piston 12 is moved downward. Accordingly, the operation can be performed with high reproducibility by setting the taper shape such that the O-ring 16 comes into contact with the inner peripheral edge of the disc D. Discs with thicknesses different from that of the disc D may also be attached by changing the height of the parallel spacer 15.

In the disc-chucking mechanism according to the present embodiment, the diameter of the O-ring 16 is increased by the tapered portion 13a of the tapered cone 13, so that the O-ring 16 presses the inner peripheral edge of the disc D. Thus, the disc D is reliably and quickly attached/detached by the disc-chucking mechanism having an integral structure without using a separate cap or a fastening screw. Therefore, a production facility for the disc-chucking mechanism is easily automated and is operated with high efficiency.

In addition, discs D having various sizes can be attached without changing the basic structure by using O-rings that match the sizes of the discs D. Accordingly, the disc-chucking mechanism is easy to design even when a commercial O-ring is used, and maintenance cost is low.

In addition, in the disc-chucking mechanism according to the present embodiment, air between the central portion 11a and the tapered cone 13 flows outward immediately before the disc D is fixed, and accordingly dust, metal particles, etc., on the surface of the disc D are cleared by the air flow.

Second Embodiment

Figure 3:
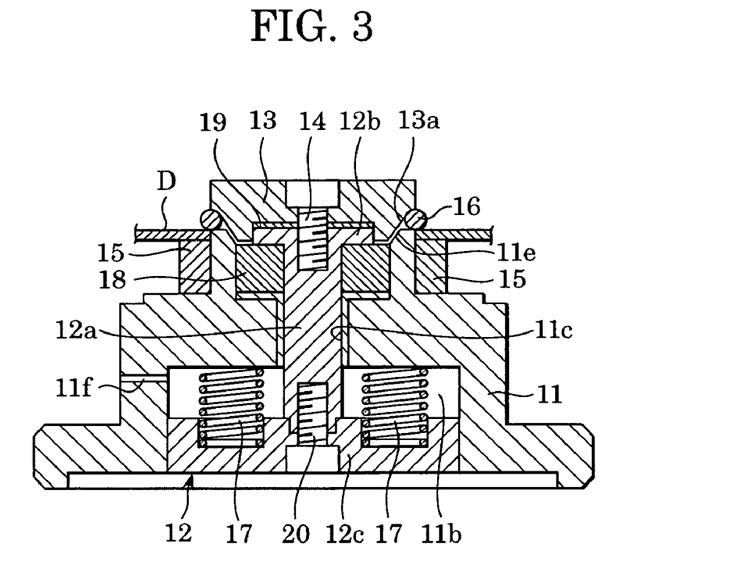
FIG. 3 is a sectional view showing a chucking mechanism according to a second embodiment.

FIG. 3 is a sectional view showing a disc-chucking mechanism according to a second embodiment. In the figure, components similar to those of the first embodiment are denoted by the same reference numerals. Similar to the first embodiment, an O-ring 16 is deformed using a tapered cone 13 connected to a piston 12, and a disc D is fixed or released accordingly.

A separate mechanical stopper 18 used when the tapered cone 13 is moved downward is provided in a central portion 11a. The bottom surface of a flange 12b provided at the top of a rod 12a comes into contact with the top surface of the mechanical stopper 18. The position to which the tapered cone 13 is moved downward is finely adjusted using a shim 19 inserted between the rod 12a and the tapered cone 13. A main body 12c and the rod 12a of the piston 12 are formed separately and are connected to each other with a screw 20.

Thus, a fixing force applied to the disc D by the O-ring 16 is set arbitrarily by finely adjusting the position to which the tapered cone 13 is moved downward.

Six coil springs 17 for applying a biasing force to the piston 12 are arranged at constant angular intervals. Since a plurality of coil springs 17 are used, a uniform pressing force is applied to the piston 12, and accordingly the disc D rotates with a good dynamic balance.

Third Embodiment

Figure 4:
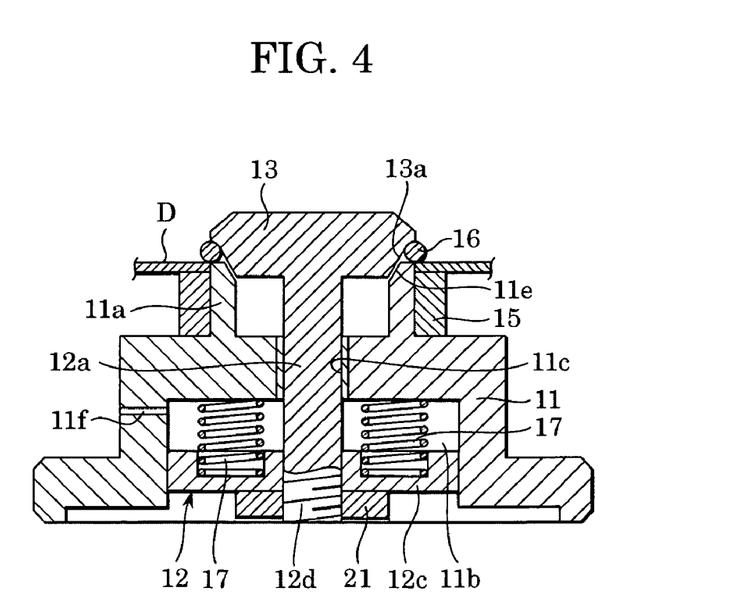
FIG. 4 is a sectional view showing a chucking mechanism according to a third embodiment.

FIG. 4 is a sectional view showing a disc-chucking mechanism according to a third embodiment. Similar to the first and second embodiments, the diameter of an O-ring 16 is changed using a tapered cone 13 connected to a piston 12, and a disc D is fixed or released accordingly. An initial position of the piston 12 is finely adjusted to arbitrarily set a biasing force applied by a coil spring 17. Thus, the fixing force of the O-ring 16 is adequately set depending on the thickness of the disc D or the rotational speed thereof.

More specifically, in the third embodiment, the tapered cone 13 is formed integrally with a rod 12a of the piston 12, and the rod 12a is formed separately from a main body 12c of the piston 12. The tapered cone 13 may also be connected to the rod 12a with a screw 14, similar to the first and second embodiments. A screw thread 12d is formed around the rod 12a in the lower region thereof. The rod 12a is inserted through the piston's main body 12c, and a lock nut 21 is engaged with the screw thread 12d.

The piston's main body 12c is moved relative to the rod 12a in the vertical direction by adjusting the position of the lock nut 21 relative to the rod 12a, and the length of the coil spring 17 in the center shaft 11 is changed accordingly. Thus, the initial biasing force of the coil spring 17 is adjusted. In the third embodiment, a mechanical stopper is not shown in the figure.

As described above, in the third embodiment, the biasing force of the coil spring 17 can be arbitrarily changed using the lock nut 21. Therefore, an optimum biasing force can be set depending on the material, the thickness, and the rotational speed of the disc D.

In the above-described embodiments, the piston 12 is optimally operated by clean high-pressure air. However, various kinds of high-pressure gases or actuators including electromagnetic solenoids and direct drive motors may also be used depending on operating conditions and environments. Alternatively, the piston 12 may also be moved upward by vacuum suction using the air vent 11f. In addition, a force obtained by injecting high-pressure air into the hollow section 11b may also be used instead of the biasing force of the coil spring 17.

Although the parallel spacer 15 is formed separately from the center shaft 11 in the above-described embodiments, they may also be formed integrally with each other.

Fourth Embodiment

Figure 5:
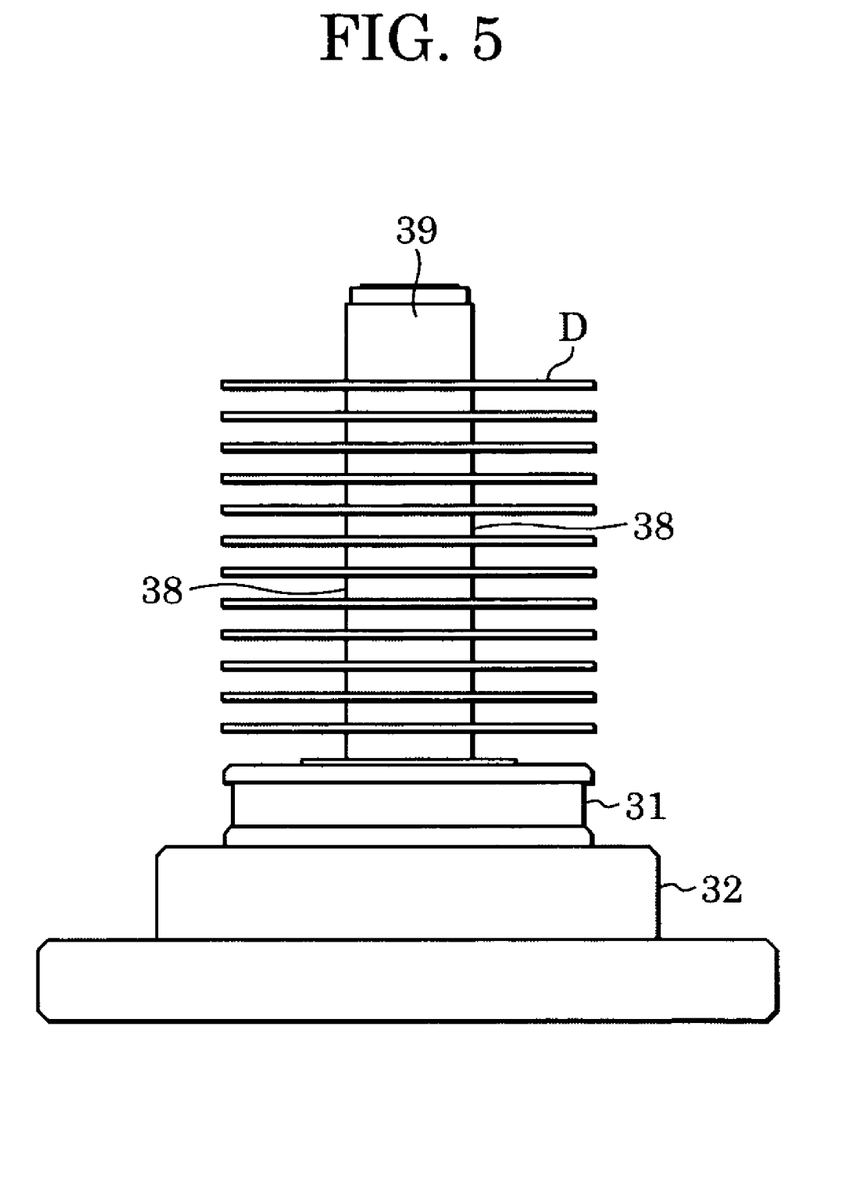
FIG. 5 is an external view showing a chucking mechanism according to a fourth embodiment.
Figure 6:
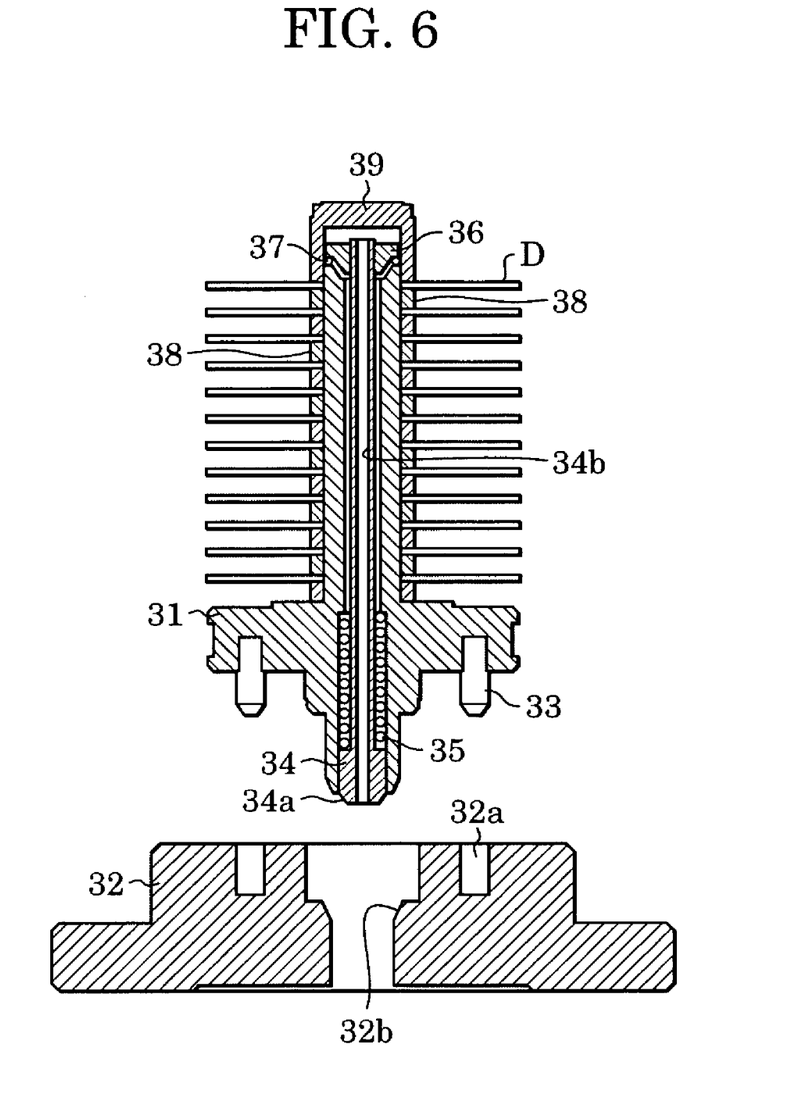
FIG. 6 is a sectional view showing the state in which a shaft and a holder are separated from each other according to the fourth embodiment.

FIG. 5 is an external view of a chucking mechanism according to a fourth embodiment, and FIG. 6 is a sectional view showing the chucking mechanism in a divided state. A component corresponding to the center shaft 11 according to the first embodiment is divided into a shaft 31 and a holder 32, and the chucking mechanism is configured to stack a plurality of discs D off-line. The chucking mechanism is used in a servo writer or the like in which multiple discs D are mounted.

The shaft 31 is mounted on the holder 32, and the shaft 31 and the holder 32 are fixed to each other by vacuum suction. A plurality of pins 33 projecting from the bottom surface of the shaft 31 are inserted into anti-slipping holes 32a formed in the holder 32, so that displacements during acceleration and stopping of a motor can be prevented. The pins 33 may also be omitted if the inertia of the shaft 31 is small.

A central portion of the shaft 31 has a release button 34a at the bottom, and a rod 34 having a vacuum suction hole 34b extending therethrough at the center is inserted in the shaft 31 such that the rod 34 can move in the vertical direction. The rod 34 is biased downward by a coil spring 35 placed between the shaft 31 and the rod 34. A bottom end portion of the shaft 31 and the release button 34a of the rod 34 are tightly fitted in an evacuation hole 32b formed in the holder 32. In addition, an upper portion of the shaft 31 has a tapered recess, and an O-ring 37 is disposed between the tapered recess and a tapered portion of a tapered cone 36 fastened to an upper portion of the rod 34 by means of screw.

A plurality of cylindrical parallel spacers 38 are stacked around the shaft 31, and discs D are disposed between the parallel spacers 38. In addition, a cap 39 is fitted at the top of the shaft 31.

Figure 7:
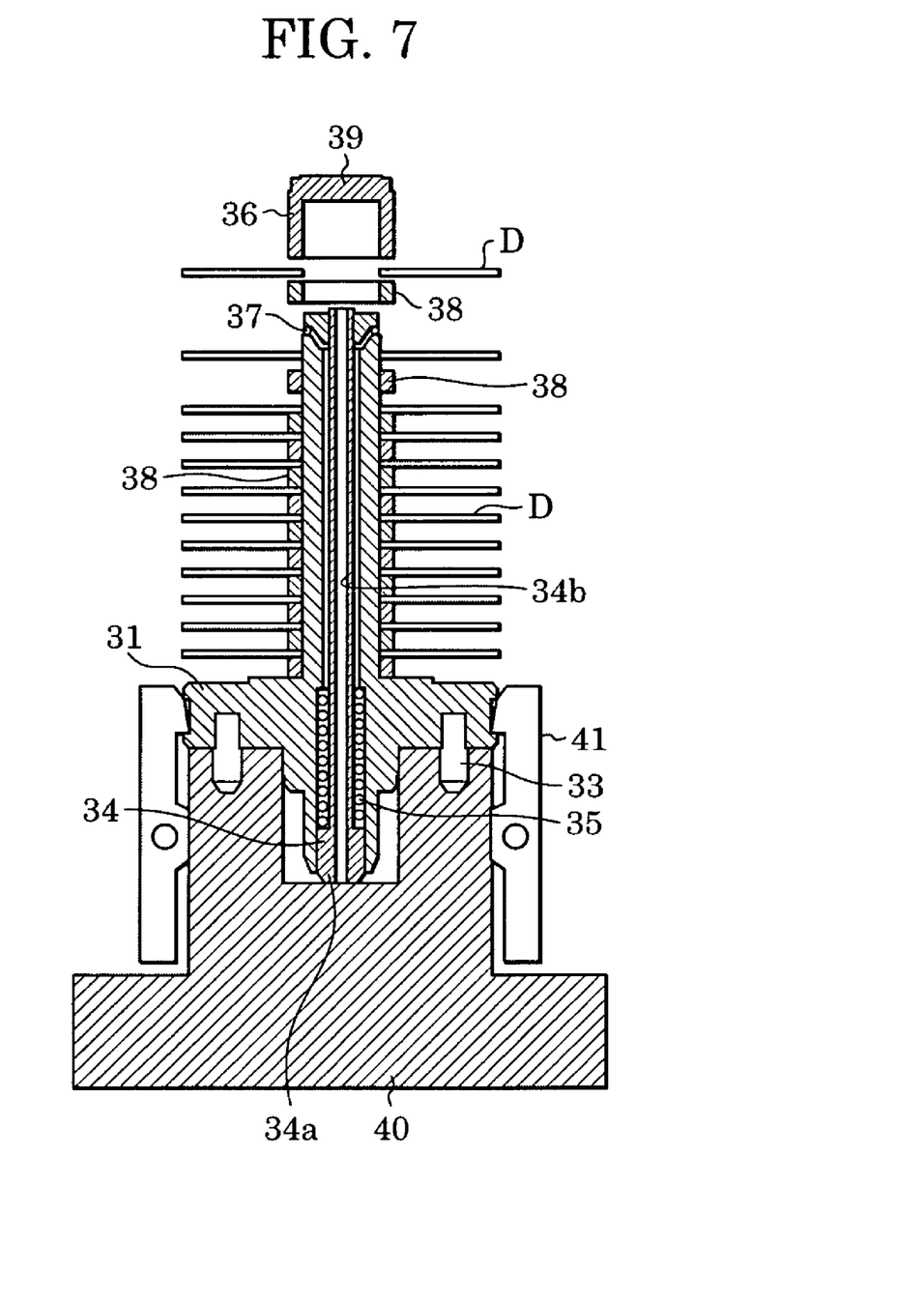
FIG. 7 is a sectional view showing the manner in which disks are attached to the shaft according to the fourth embodiment.

When the discs D are fixed to the shaft 31, first, the shaft 31 is attached to a dedicated disc-stacking tool 40 with a locking member 41, as shown in FIG. 7. Then, the parallel spacers 38 and the discs D are alternately stacked around the shaft 31, and a cap 39 is attached at the top.

The rod 34 which extends through the hole in the shaft 31 is pushed upward when the release button 34a at the bottom comes into contact with the disc-stacking tool 40.

When the rod 34 is pushed upward, the tapered cone 36 moves upward together, and the restraining force applied to the O-ring 37 reduces. Accordingly, the O-ring 37 contracts so that the discs D, the parallel spacers 38, and the cap 39 can be smoothly attached.

After the discs D, the parallel spacers 38, and the cap 39 are attached, the shaft 31 is released from the disc-stacking tool 40. Accordingly, the rod 34 moves downward due to the biasing force of the coil spring 35 and the tapered cone 36 expands the O-ring 37, so that the cap 39 is provisionally fixed by the O-ring 37. Finally, the shaft 31 is attached to the holder 32, and the provisionally fixed cap 39 and the shaft 31 are retained by vacuum suction through the evacuation hole 32b in the holder 32.

At the same time, the vacuum suction force serves to fix the inner peripheral edges of the discs D via the cap 39 and the parallel spacers 38. If the evacuation is performed gradually, the pressing force of the cap 39 is gradually and evenly applied to the inner peripheral edges of the discs D via the parallel spacers 38, so that the discs D are prevented from being deformed.

Since the cap 39 is provisionally fixed, the discs D and the parallel spacers 38 do not fall while the shaft 31 is being moved to the holder 32. In addition, since the process of attaching the discs D is performed off-line by removing the shaft 31 from the holder 32, the efficiency of the process can be increased by preparing a plurality of shafts in advance.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-020231 filed Jan. 28, 2004, and Japanese Patent Application No. 2004-141858 filed May 12, 2004, which are hereby incorporated by reference herein.

What is claimed is:

1. A disc-chucking mechanism for fixing a ring-shaped disc, the disc-chucking mechanism comprising:
a center shaft having a tapered recess, a hollow section, and a hole extending from the tapered recess to the hollow section, wherein the center shaft is adapted to support the disc;
a piston provided in the hollow section;
a rod attached to the piston, wherein the piston is operable to move the rod through the hole;
a tapered cone having a tapered portion sized and shaped to fit in the tapered recess of the center shaft,
wherein the rod extends through the hole and is attached to the tapered cone so that the piston can move the tapered cone; and an elastic O-ring having a variable diameter, wherein the O-ring is disposed between the tapered portion and the tapered recess, wherein, as the piston moves the tapered portion in a first direction, the tapered portion expands the diameter of the O-ring so that the O-ring presses the disc and fixes the disc, and wherein, as the piston moves the tapered portion in a second direction, the tapered portion moves relative to the O-ring such that the diameter of the O-ring contracts to move out of contact with the disc and releases the disc.

2. The disc-chucking mechanism according to claim 1, further comprising a cylindrical parallel spacer supporting the disc at the O-ring.

3. The disc-chucking mechanism according to claim 1, wherein an outer diameter of the tapered cone and an outer diameter of the O-ring in a contracted state are smaller than an inner diameter of the disc.

4. The disc-chucking mechanism according to claim 1, further comprising an adjuster configured to finely adjust and limit the movement of the tapered cone in the first direction.

5. The disc-chucking mechanism according to claim 1, wherein the piston is operated by air pressure.

6. The disc-chucking mechanism according to claim 1, further comprising a coil spring providing a biasing force to operate the piston.

7. The disc-chucking mechanism according to claim 6, wherein an initial biasing force of the coil spring is set by adjusting the position of the piston relative to the rod.

8. A spindle motor comprising the chucking mechanism according to claim 1.

9. A servo track writer comprising the spindle motor according to claim 8.

* * * * *